Oct. 22, 1974  R. FREAKE ET AL  3,843,452

MICROBIOLOGICAL TEST ARTICLE

Filed April 26, 1972  2 Sheets-Sheet 1

United States Patent Office 3,843,452
Patented Oct. 22, 1974

3,843,452
MICROBIOLOGICAL TEST ARTICLE
Ronald Freake and Billy Harper Haden, Elkhart, Ind.,
assignors to Miles Laboratories, Inc., Elkhart, Ind.
Filed Apr. 26, 1972, Ser. No. 247,751
Int. Cl. C12b 1/04
U.S. Cl. 195—103.5                                                7 Claims

ABSTRACT OF THE DISCLOSURE

Test Article for use in microorganism collecting, retaining or culturing procedures comprising a laminated structure utilizating a substantially flat absorbent web such as paper, and a microporous membrane overlay, the web and membrane being prepared such that a continuous interface is formed therebetween, said interface comprising a composite of the membrane and web. A preferable method of preparing this article comprises solubilizing a polymeric membrane forming material in an appropriate solvent therefor and casting this material onto the absorbent web such that the above interface is formed. Another preferable embodiment comprises incorporating chemical, biochemical or biological substances into or onto the membrane or web, or both.

BACKGROUND OF THE INVENTION

The examination of certain body fluids for the presence of microorganisms, such as in the detection of bacteria in urine, provides useful information to the physician or microbiologist in the diagnosis of certain diseased conditions, and to this end numerous test systems and devices for detecting bacteria and fungi have been proposed and developed over the years. Such detection means also find utility in the examination of medicaments, foodstuffs, water supplies, swimming pools, and other areas or environments where certain types of microorganisms are detrimental or comprise a health hazard.

DESCRIPTION OF THE PRIOR ART

A comprehensive description of the prior art relating to bacteria and microorganism testing and detecting means is beyond the scope of this specification. Briefly, however, it may be stated that in order to achieve any degree of accuracy and reliability, such methods usually comprise inoculating a specially formulated growth medium with the fluid being tested, incubating this system under standardized conditions and observing the formation of colonies of bacteria or other microorganism growing therein or thereon. The usual and classical methods of incubating such test materials with the formulated growth medium comprises the use of petri dishes into which agar gel is deposited. Such methods, needless to say, are time consuming, and require the use of skilled technicians and complete laboratory facilities in order to fabricate such devices and analyze the results obtaind thereby.

Recently, however, methods have been devised in which the agar gel is replaced by a nutrient imprengated pad. Such pad may comprise a bibulous material such as paper into which the nutrient medium is incorporated in a dried state. In addition to the pad, such devices usually utilize a membrane means in association with the nutrient impregnated pad. These devices are usually employed as test devices by reconstituting the dry media with a sterile fluid, streaking the membrane surface of the device with the test fluid, incubating the same under standardized conditions and observing the growth of microorganism locations on the surface of the membrane. U.S. Pat. Nos. 2,672,431; 2,672,432; 2,677,649; 2,677,647; 2,761,813; 2,923,669; 2,954,327; 3,247,078; 3,448,011, and 3,493,772 describe various devices, methods and apparatus which involve the use of membane means and nutrient pads for microbiological test systems. Such devices are constructed by simply associating the membrane and nutrient pad by retainer and other physical means. For example, in U.S. Pat. No. 2,672,431, the nutrient pad and membrane are retained in wettable contact utilizing a holder and a flange means.

As far as the utility of such prior art devices is concerned, it has been found that they suffer from certain drawbacks. For example, upon contact with the wet nutrient pad, the membrane tends to warp and wrinkle. When this happens, quantitative results are not possible since any microorganisms which lay directly over any void that occurs between the pad and membrane will not grow due to nutrient starvation. That is, the nutrients cannot diffuse up through the membrane and contact the microorganism, which in turn will not appear as a colony location. As a result, the count obtained is not quantitative. Moreover, when wrinkling of the membrane takes place, microorganisms tend to flow to low points on the surface of the membrane, and clusters of colony locations appear which make counting exceedingly difficult.

SUMMARY OF THE INVENTION

It has now been found that bacteriological test articles having improved readout characteristics, convenience and reactivity can be prepared by forming a laminated structure comprising an absorbent web and a microporous membrane, the laminated structure being prepared such that a continuous interface comprising a composite structure of web and membrane is formed between the web and membrane. A preferable embodiment of the present invention comprises incorporating a test material such as a chemical or biochemical reagent or biological substance in or on the membrane or web.

DESCRIPTION OF THE PREFERRED EMBODIMENTS

In the present invention it has been found that by forming a continuous interface between the web and membrane in a test device or article containing a test material such as a nutrient medium, a superior device is obtained. As noted above, the prior art methods of associating membranes and web or pad structures has been to simply physically contact the two materials using a sleeve and retainer ring or sticking the two materials together using an adhesive. It will be appreciated that in such devices, any void between the web and membrane will result in a negative bacterial growth or test result in the area of the void. Moreover, since biological substances such as bacteria or fungi are susceptible to the cidal action of certain chemicals, the selection of an adhesive material is critical in the preparation of a composite web and membrane by prior art methods.

Figure 1:
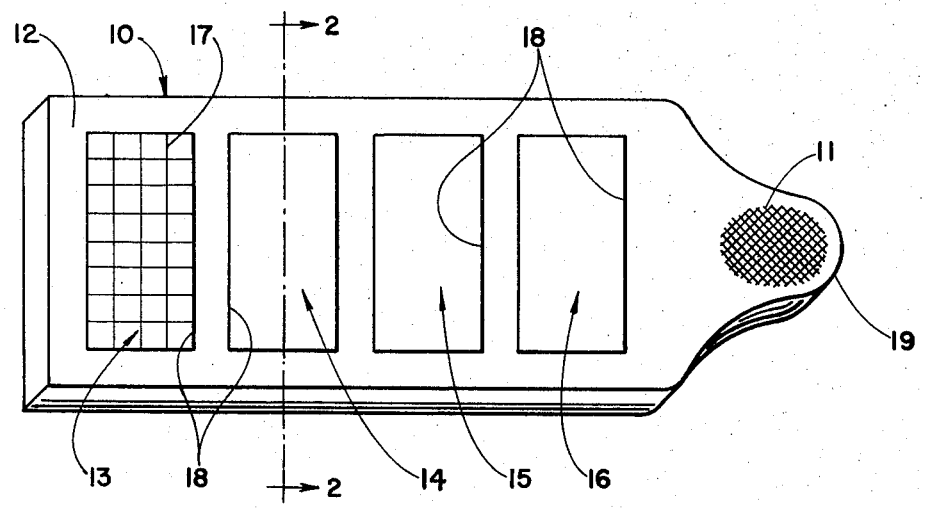
FIG. 1 is a perspective plan view of a device utilizing the laminated structures of the present invention.

Referring now to the drawings, FIG. 1 shows a multiple test device 10 comprising an elongated base member 12 having a series of similar rectangular wells 18 molded therein. The base member 12 may be of molded plastic such as polystyrene and may have a projection 19 having a roughened surface portion 11, which projection 19 acts as a handle means for the facile manipulation thereof by using fingers. The wells 18 are respectively fitted with rectangular laminated structures 13, 14, 15 and 16 which are impregnated with the same or different reagents and/or culture media as will be described later. Laminated structure 13 is printed or otherwise provided with grid lines 17 which facilitate colony counting.

Figure 2:
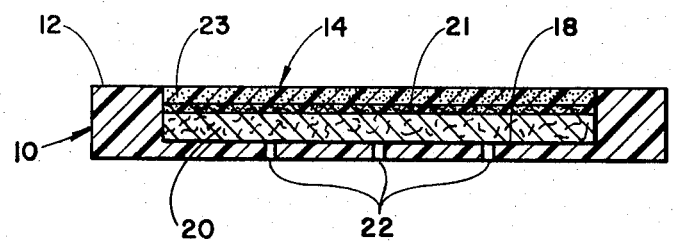
FIG. 2 is a sectional view of the device of FIG. 1 taken along the line 2—2 thereof.

In FIG. 2, the laminated structure 14 is shown as consisting of an absorbent web 20, such as paper, to which in microporous membrane 23 is associated via an interface 21 which is a composite of the web 20 and membrane 23. Vents 22 may be provided in the base member 12 to allow fluid to enter recess 18 therethrough and be absorbed into web 20.

Figure 3:
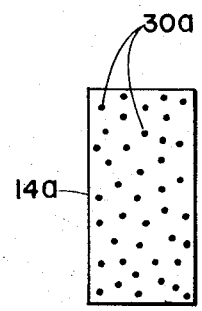
FIGS. 3, 4 and 5 are plan views of test devices showing bacterial colony growth locations.
Figure 4:
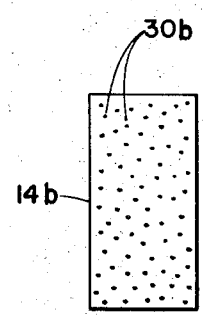
Figure 5:
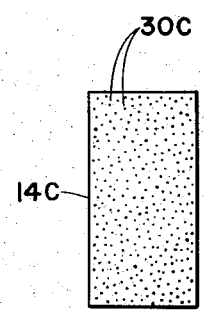

FIGS. 3, 4 and 5 are plan views of rectangular laminated structures 14a, 14b and 14c which are like structure 14, and which have been contacted with a fluid to be checked for microorganism content with the result that bacterial colony locations 30a, 30b and 30c have grown thereon. FIG. 3 shows colony locations 30a which are indicative of $10^3$ bacteria per mil. of fluid being tested, while FIGS. 4 and 5 show colony locations 30b and 30C which are respectively indicative of $10^4$ and $10^5$ bacteria per ml. of fluid being tested.

Figure 6:
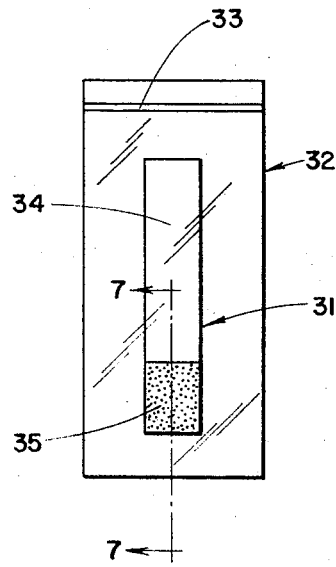
FIG. 6 is a plan view of a device of the present invention enclosed within a transparent container therefor.
Figure 7:
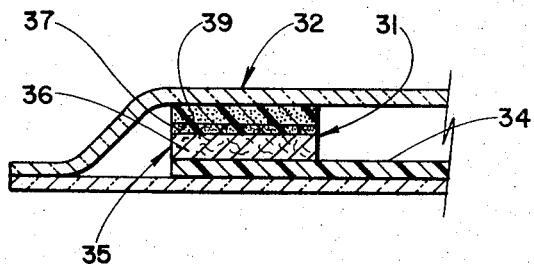
FIG. 7 is an enlarged fragmentary sectional view of the device and container shown in FIG. 6 taken along lines 7—7 thereof.

In FIGS. 6 and 7, a test device 31 is illustrated which consists of an elongated strip of plastic foil 34 acting as a handle means for a rectangular laminated structure 35 and which is affixed to one end thereof impregnated with culture medium. Such impregnation will be further described hereinafter. As shown, the test device 31 is loosely enclosed within a sealed transparent plastic envelope 32 having an interlocking seal lip 33. Once the device 31 is placed in the envelope 32 and the seal 33 is closed, it is sterilized using a method such as subjecting the envelope and contents to bactericidal electromagnetic radiation or a bactericidal gas capable of penetrating the envelope 32.

In FIG. 7, the laminated structure 35 is shown as consisting of an absorbent web 36 and a microporous membrane 39 joined by a continuous interface 37.

Figure 8:
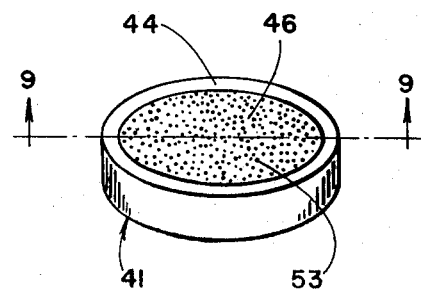
FIG. 8 is a perspective view of a disc-type device comprising the laminated structure of the present invention.

FIG. 8 is a perspective view showing a disc shaped laminated structure 41 the upper surface of which comprises a membrane having a hydrophilic center portion 46 and a peripheral edge portion 44 which is preferably rendered hydrophobic by treating with silicone oil or heat sealing. The hydrophilic center portion 46 is covered with the dried remains 53 of a microorganism culture suspension.

Figure 9:
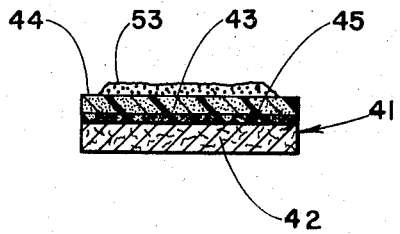
FIG. 9 is a vertical sectional view taken along the line 9—9 of FIG. 8.

FIG. 9 is a vertical sectional view of the disc shaped device 41 of FIG. 8 taken along lines 9—9. In this figure the disc 41 is shown comprising an absorbent web 42 which may be impregnated with microorganism nutrients. This web 42 is joined with a microporous membrane 43 through interface 45. The peripheral edge 44 of the surface of disc 41 is hydrophobed and the center portion is covered with the dried remains of a microorganism culture suspension 53 as indicated above and later described in the examples.

Figure 10:
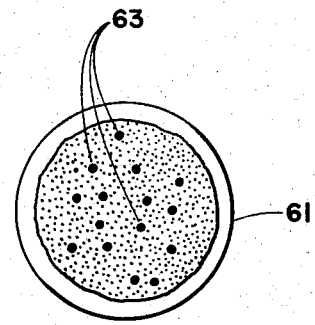
FIG. 10 is a plan view of a device of the present invention showing colonies or locations of microorganisms developed thereon.

FIG. 10 shows a laminated disc device 61 which is similar to the disc device 41 of FIGS. 8 and 9, after the nutrients in the device have been reconstituted with distilled water, followed by incubation and development of colonies of microorganisms 63 thereon.

The absorbent webs 20, 36 and 42 of devices 10, 31 and 41, respectively, may be of paper, cloth, wood or any other suitable material capable of absorbing a solution or suspension and retaining the same as a liquid for a period of time or of retaining the dry solids remaining after the web has been impregnated with a solution or suspension and dried.

The microporous membranes 23, 39 and 43 of devices 10, 31 and 41 respectively, are preferably formed of a polymeric material such as a cellulose ester and may be prepared by a procedure such as that disclosed in U.S. Pat. No. 1,421,341 to Zsigmondy or described in the article by Zsigmondy and Bachmann in Anorg. Allgem. Chem., 103, 119 (1918). Specific polymeric materials which are useful in preparing microporous membranes are cellulose triacetate, cellulose nitrate, regenerated cellulose, polyvinylchloride (PVC), nylon, and so forth.

The composite of membrane and absorbent web is prepared by dissolving the polymeric material in an appropriate solvent and casting the same onto the absorbent web such that a certain amount of the solvated polymeric material penetrates into the web and forms a continuous interface between the membrane and web.

In preparing the laminated structures of the present invention, it has been found that a continuous interface of about from 1 micron to 5 microns thick is preferable. Moreover, the porosity of the membrane is preferably adjusted to prevent the passage therethrough of the microorganism being determined while allowing nutrients and other solutions to freely pass through such membrane. In this regard, since the smallest bacteria is about 0.22 micrometer in diameter, a membrane having a pore size of about from 0.01 up to 0.2 micrometer may be advantageously used. However, it is to be understood that when larger microorganisms such as yeasts are being determined, and/or a higher solution flow rate through the membrane is desired, a membrane pore size larger than 0.2 micrometer and up to about 2.0 micrometers may be desirable.

As for the microporous membrane portion of the laminated structure, it has been found that a membrane having a thickness of from about 3 micrometers to 10 micrometers is preferable. The size of the absorbent web is obviously dependent upon the particular characteristics of the device; however, a pad about from 1 mm. to 2 mm. thick may be utilized.

As initially disclosed, a preferable embodiment of the present invention comprises incorporating or associating the laminated structure with test materials such as chemical, biochemical and/or biological substances so that the structure may be utilized as a test device or other article of manufacture for determining the type and/or quantity of microorganism in an environment or for implementing the delivery, storage and use of microorganisms. In this regard various nutrient compositions or media such as Actinomyces Broth, Beef Lactose, Brain Heart Infusion, Azide Dextrose, Christensen's Formulation, Tryptose Blood Agar, Formate Ricinoleate Broth, Loeffler's, MacConkey's, M-Yeast Broth, Sabourand Medium, Nickerson's Formula, and so forth, and variations thereupon, may be incorporated in or on the microporous membrane and/or absorbent web. Such nutrient compositions or variations thereupon may be chosen to provide either a substantially universal growth medium to detect all microorganism growths or a microorganism-specific growth medium. Variations upon standard nutrient compositions would be required in order to effectively adapt the plate system to a dehydrated absorbent web-membrane system as herein described. For instance, it has been found that an appropriate variation upon Nickerson's formula for use in a dehydrated absorbent web-membrane system functions as an isolating test for *Candida* and is thereby useful as a quantitative monilial detection system. Moreover, the laminated structure may include various microorganisms such as *Staphylococcus aureus, Streptococcus pyrogenes, Streptococcus faecalis, Diplococcus pneumoniae, Haemophilius influenzae, Klebsiella pneumoniae, Escherichia coli, Proteus mirabilis, Solmonella* sp., "O" strain coli, yeast, fungi and the like thereby making possible ready to use stock reference cultures in a stable form.

It has been found that certain suspending or stabilizing agents are preferably included with the reagents which are incorporated with the laminated structures of the present invention. Such suspending agents serve the dual function of allowing the incorporation of predetermined numbers of microorganisms or specific concentrations of media and facilitate the rehydration of the reagent after contact with the fluid being tested as will be explained hereinafter.

As the suspending agent, it has been found that any of the microbiologically inert colloidal materials may be used. As the term is used herein a microbiologically inert material is a material which in no way exerts a deleterious effect on the microorganism being used. In order to facilitate the accurate delivery of the reagents, it is also preferable that a concentration be used such that the suspending agent does not form a gel. Among the inert colloidal agents found useful in the present invention are the acid polysaccharides having esterified or free carboxyl groups such as the pectins, pectic araban and galactan, seaweed polysaccharides such as the carragheenins and the alginates and other complex polysaccharides. Other classes of inert colloidal agents useful in the present invention comprise gelatin and similar protein degradation products, inert natural gums, the cellulose gums such as methylcellulose and colloidal silica.

The concentration of suspending agent depends on the particular thickening qualities of the agent selected. In general, however, sufficient suspending agent is used so that when the reagent is in the form of an aqueous suspension, from about 1.0% to 2.0% by weight of suspending agent is present. This, however, may vary with each media formulation and for some applications may be as high as 8% or as low as 0.1%.

It has been found that the water soluble alginates are particularly advantageous for use as suspending agents in the present invention. These substances are naturally occurring polysaccharides found in algae. The water soluble sodium salt, called algin, is the most important of such alginates. It has been found that about from 1.0% to 2.0% by weight and preferably 1.25% of sodium alginate is advantageously used as a suspending agent in the present invention.

The laminated structure of the present invention is usually prepared using a casting technique, that is, the polymeric membrane material is dissolved in a suitable nontoxic volatile solvent and, using controlled conditions, a fluid film is deposited on the absorbent web. Depending on the viscosity of the fluid film, as well as the drying conditions employed, a definite amount of polymer will penetrate into the absorbent web creating a continuous interface between the microporous membrane and the absorbent web. The solvent is then removed, to create both a microporous membrane structure and a continuous interface between the web and membrane.

As previously noted, the laminated structures of the present invention find utility in several areas of microbiology. They may be used simply to implement the storage, delivery and use of microorganisms such as in quality control use, or they may be used as nutrient containing microbiological test devices. In quality control use, it is contemplated that a series of standard devices be used to test batches of media, agar gel, and the like, and that the minimum number of organisms necessary to initiate growth be established. This minimum number is termed the "isolating coefficient" for the particular system or medium being checked. For example, a new batch of medium may be prepared and tested with a series of standards varying between 5 and 100 colonies per standard. Under standard growth conditions, the medium will initiate and support microorganism growth only when a sufficient number of such microorganisms are present in the standard. Thus, by using a series of standards having known different numbers of microorganisms, the isolating coefficient of a medium can be readily identified by noting the standard, among those in the series which show colony growth under the standardized conditions, which has the smallest number of microorganisms. The number of microorganisms constituting the isolating coefficient may also be termed the minimum inoculum.

When used as a test device, the laminated structure is incorporated with specific nutrient medium and dried. Such nutrients are selected depending upon the specific microorganism being detected and may be included in either or both the absorbent web and microporous membrane. In "dip-incubate-read" testing procedures, the device is inoculated by momentarily immersing it in the fluid to be tested for the presence of microorganisms. The excess fluid is allowed to run off of the surface, and the device is incubated for a predetermined time under standard conditions. Another possible test method involves rehydration of the structure with a sterile liquid and thereafter inoculation of the membrane surface through "streaking" or swabbing followed by incubation under standard conditions. Still another possible method of inoculation involves contacting the membrane surface with tissue to be tested for microorganism growth. The membrane functions as a buffer zone allowing inoculation of the surface of the membrane while retarding possible elution of the reagents out of the absorbed web and onto the tissue being tested. This method is particularly useful in conjunction with incorporating a microorganism-specific nutrient medium into the device as previously described, thereby providing a test procedure for the detection of a particular microorganism by contacting the device directly with tissue to be tested.

The device is preferably placed in a container or envelope during the incubation period to prevent any evaporation of fluid therefrom. During the incubation period, fluid from the absorbent web containing nutrients flows up through the membrane to the surface thereof and any microorganisms present from the fluid being tested grow into circular colony locations on the surface of the membrane, since the porosity of such membrane will retain such locations on the surface thereof. After the incubation period, the colony locations are simply counted or compared to a drawing or photograph showing a series of standard colony locations of varying numbers.

The present invention will now be illustrated by the following examples:

EXAMPLE 1

A polymer solution was prepared by completely dissolving 7 grams of cellulose nitrate in 100 ml. of a 50% ether/50% alcohol mixture. Distilled water was added until the solution appeared cloudy whereupon the solution was agitated overnight. A fluid film of this agitated polymer solution was dispersed on the surface of a sheet of S and S No. 470 paper. The filter paper plus fluid film was immediately dried at ambient temperature for one hour resulting in a laminated structure having a microporous membrane with a mean pore size diameter of about 0.1 micrometers and an interface about 5 micrometers thick.

EXAMPLES 2-5

The laminated structure prepared according to Example was cut into rectangles approximately 2 cm. by 2 cm. shown as numbers 13, 14, 15 and 16 in FIGURE 1. The rectangles were impregnated with nutrient media as follows:

| Example | Nutrient media | Microorganism being detected |
|---|---|---|
| 2 | Yeast medium | Candida. |
| 3 | Nutrient with indicator | Generally all common pathogens. |
| 4 | Tellurite glycine media | Straphylococcus. |
| 5 | S and S media | Salmonella and Shigella. |

One of each of the rectangles of Examples 2, 3, 4 and 5 was placed in the base member 12 of device 10 shown in FIG. 1. The device was momentarily immersed into a sample of urine to be tested for the presence of bacteria, shaken to remove excess urine, placed in a petri dish and incubated at 37° C. for 18–24 hours. The results were as follows:

| Example | Result |
|---------|--------|
| 2 | Brown Raised Yeast Colonies. |
| 3 | Red Raised Colonies. |
| 4 | Black Raised Colonies. |
| 5 | Opalescent Raised Colonies. |

EXAMPLE 6

The laminated structure of Example 1 was cut into 12 mm. diameter circular discs. A one millimeter edge portion of the membrane portion of the disc was then hydrophobed by heat sealing. The absorbent web portion of the disc device was then impregnated with the following nutrient composition and dried:

| | Percent by weight |
|---|---|
| Peptone | 0.3 |
| Sodium Chloride | 0.5 |
| Tryptose | 1.0 |

A culture of *Escherichia coli* was then prepared by inoculating therewith a stabilized culture medium having the following composition:

| | Gm. |
|---|---|
| Peptone | 0.5 |
| Sodium Alginate | 0.5 |
| Sterile, distilled water to make 100.0 ml. | |

The culture was incubated overnight at 37° C.

The next morning, 10 ml. of the culture was thoroughly mixed for 2 minutes using a vortex mixture device, and after a 3 minute wait to allow the air bubbles to disperse, a second tube of the above culture medium was inoculated with 0.01 ml. of the first culture. The second subculture was incubated for 8 hours at 37° C. A third subculture was made in the manner described above and allowed to incubate overnight at 37° C.

Using the third subculture, a working culture was prepared by again adding 0.01 ml. thereof to 10.0 ml. of the stabilized culture medium and incubating for exactly 8 hours at 37° C. A dilute, stabilized bacterial suspension was then prepared by transferring 0.01 ml. of the working culture to 15.0 ml. of a suspending/lyophilizing medium having the following composition:

| | Gm. |
|---|---|
| Peptone | 0.5 |
| Sodium alginate | 0.5 |
| Glucose | 7.5 |
| Sterile, distilled water to make 100.0 ml. | |

Using a precision micro delivery apparatus (B. Braun—Unita 1—Type No. 871010—Continuous Infusion Apparatus—Catalog No. 71012) 0.02 ml. of the above dilute bacterial suspension was added to the surface of the microporous membrane portion of the disc device. The suspension added to the disc formed a circular pattern 11 mm. in diameter and was freeze dried, after which the disc was placed in a vial and retained under vacuum.

The nutrient pad was then impregnated with distilled water and the device incubated at 37° C. for twelve (12) hours. At the end of the incubation period the colony count was found to be thirty (30).

Such devices act as a check on the viability of microorganisms being retained on microporous membranes and at the same time provide a convenient, stable means of maintaining stock cultures.

What is claimed is:

1. In an article of manufacture for use in microbiology comprising an absorbent web having a substantially flat surface and a microporous membrane overlaying at least a portion of said surface, which article is for use in microbiological applications wherein a microorganism is contacted with the surface of said microporous membrane, the improvement wherein said membrane has a mean pore size greater than about 0.01 micrometers while small enough to prevent passage of said microorganism therethrough and said web and membrane being joined by a continuous interface therebetween, integral therewith, and comprising a composite of the web and membrane.

2. An article as in Claim 1 wherein a microbiological nutrient material is incorporated with said absorbent web.

3. An article as in Claim 1 wherein said microbiological nutrient material is in a dry state.

4. An article as in Claim 1 wherein a quantity of at least one variety of microorganism is disposed on a surface portion of said microporous membrane.

5. An article as in Claim 4 wherein said quantity of microorganism is in a dry state.

6. An article as in Claim 4 wherein a colloidal suspending agent is in combination with said quantity of microorganism.

7. An article as in Claim 4 wherein said quantity of microorganisms is the minimum inoculum required to produce observable microbiological growth under predetermined conditions of membrane.

References Cited
UNITED STATES PATENTS

| | | | |
|---|---|---|---|
| 3,092,465 | 6/1963 | Adams et al. | 23—253 TP |
| 2,672,432 | 3/1954 | Goetz | 195—139 |

A. LOUIS MONACELL, Primary Examiner

R. B. PENLAND, Assistant Examiner

U.S. Cl. X.R.

195—139

UNITED STATES PATENT OFFICE
CERTIFICATE OF CORRECTION

Patent No. 3,843,452          Dated October 22, 1974

Inventor(s) Ronald Freake & Billy Harper Haden

It is certified that error appears in the above-identified patent and that said Letters Patent are hereby corrected as shown below:

In Column 1, Line 50, "microorganism" should read --microorganisms--.

In Column 1, Line 57, "obtaind" should read --obtained--.

In Column 1, Line 59, "imprengated" should read --impregnated--.

In Column 4, Line 73, "Solmonella" should read --Salmonella--.

In Column 8, Line 30, "1" should read --2--.

In Column 8, Line 43, "membrane" should read --incubation--.

Signed and sealed this 11th day of March 1975.

(SEAL)
Attest:

RUTH C. MASON
Attesting Officer

C. MARSHALL DANN
Commissioner of Patents
and Trademarks